No. 883,436. PATENTED MAR. 31, 1908.
G. H. WELLS.
HARROW.
APPLICATION FILED MAR. 27, 1907.
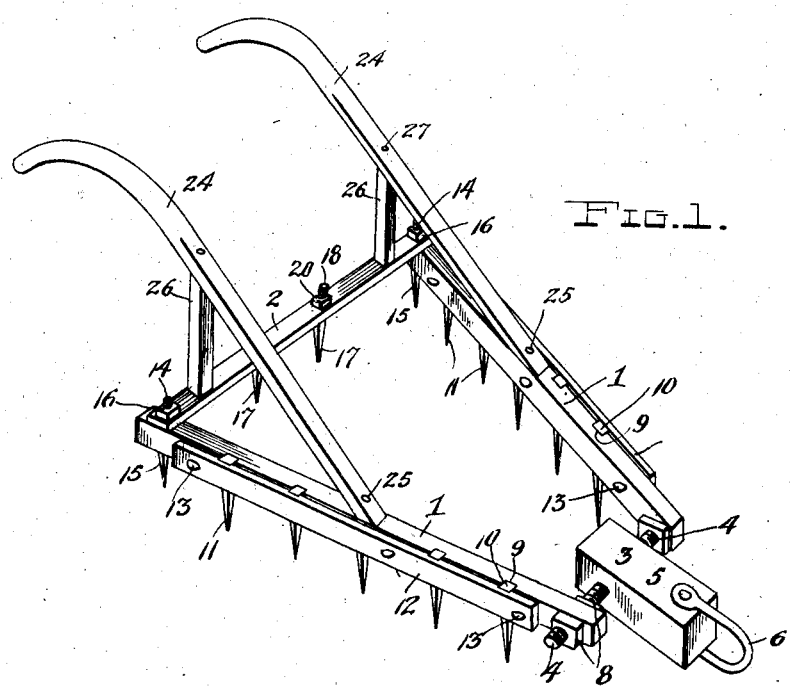
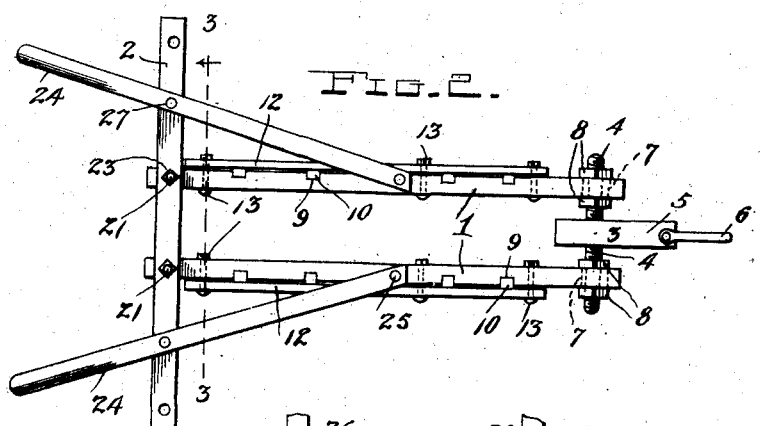
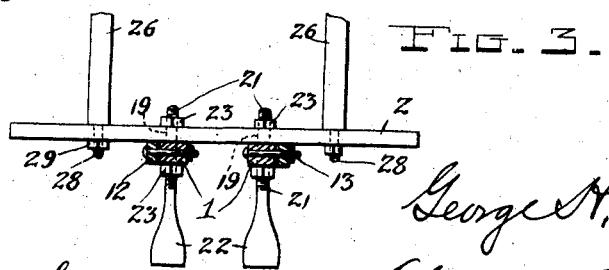
Witnesses
Chas. L. Griesbauer.
H. B. Campbell
Inventor
George H. Wells
By Watson E. Coleman
Attorney

UNITED STATES PATENT OFFICE.

GEORGE H. WELLS, OF NEINDA, TEXAS.

HARROW.

No. 883,436.  Specification of Letters Patent.  Patented March 31, 1908.

Application filed March 27, 1907. Serial No. 364,871.

*To all whom it may concern:*

Be it known that I, GEORGE H. WELLS, a citizen of the United States, residing at Neinda, in the county of Jones and State of Texas, have invented certain new and useful Improvements in Harrows, of which the following is a specification, reference being had therein to the accompanying drawing.

My invention relates to improvements in harrows and consists in the novel features hereinafter described and claimed.

One object of the invention is to provide a device of this character which may be readily adapted for use as a cultivator.

Another object of the invention is to provide a harrow with means whereby it may be adjusted to vary the spaces between its teeth and with an improved means for removably securing the teeth upon its bars or beams.

The above and other objects are accomplished by the improved construction illustrated in the accompanying drawings, in which Figure 1 is a perspective view of the harrow, showing it adapted for use as such; Fig. 2 is a top plan view, showing it adapted for use as a cultivator; and Fig. 3 is a detail vertical transverse section taken on the plane indicated by the line 3—3 in Fig. 2.

My improved harrow is preferably of V-form and comprises two diverging tooth bars or beams 1 having their rear ends pivotally and adjustably connected to a rear cross bar 2 and their front ends adjustably connected by a front cross piece 3 consisting of screw threaded studs 4 projecting from the opposite sides of a block 5. To the latter is connected a clevis or clip 6 for the attachment of a draft animal. The threaded studs or rods 4 project through elongated apertures 7 in the bars 1 and have screwed upon them nuts 8 between which the bars 1 are clamped and held in an adjusted position. Formed in the outer vertical faces of the bars 1 are recesses or seats 9 for the flattened upper ends 10 of pointed harrow teeth 11. Said ends of the teeth are clamped in the seats 9 by resilient bars 12 which are arranged upon their outer faces and the outer faces of the bars 1 and are clamped to the latter by transverse bolts or similar fastenings 13 passed through them, as clearly shown in the drawings.

When the device is to be used as a harrow, the rear ends of the bars 1 are secured to the outer ends of the rear cross bar 2, as shown in Fig. 1. This attachment of the bars 1 to the bar 2 is effected by forming in said bars vertically alining apertures for the reception of the threaded upper ends 14 of the rearmost harrow teeth 15 and by providing nuts 16 upon the threaded ends or shanks 14 above the bar 2 and beneath the bars 1. When the device is used as a harrow, I also provide upon the intermediate portion of the bar 2 one or more harrow teeth 17 which are similar to the teeth 15, that is, they have threaded upper ends or shanks 18 which are passed through vertical apertures 19 in the bar 2 and have clamping nuts 20 upon them for adjustably securing them upon the bar 2. When the device is to be used as a cultivator, the inner ends of the bars 1 are moved inwardly so that their apertures aline with the apertures 19 in the intermediate portion of the bar 2 and the threaded upper ends 21 of cultivator shovels 22 are then passed through said alining apertures, as will be seen upon reference to Fig. 3. Nuts 23 are arranged upon the threaded ends or shanks 21 above the bar 2 and below the bars 1, as clearly shown in said figure. This connection permits the cultivator shovels or hoes 22 to be adjusted vertically so as to vary the depth to which they enter the ground. The device is provided with upwardly and rearwardly inclined handle bars 24 which have their lower and forward ends pivoted at 25 upon the tops of the bars 1 and their upper rear ends curved to provide hand grips. The handle bars are supported by upright braces 26 which have their upper ends connected at 27 to said bars and their lower ends formed with reduced threaded stems 28 which are passed through apertures in the bar 2 and have nuts 29 upon their projecting ends, as will be seen upon reference to Fig. 3. The pivotal connection 25 and the adjustable connection of the lower ends of the braces 26 permit the inner ends of the bars 1 to be swung in or out upon the bar 2 in changing the device from a harrow to a cultivator or vice versa.

From the foregoing it will be seen that the device or implement may be adapted for use in harrowing the ground, cultivating corn or cotton, scratching or dividing cotton and corn and for similar purposes. The adjustable connection at the front ends of the bars 1 permits the angle between them to be varied to cause the teeth 11 to travel in paths closer to or farther from each other. The adjustable connection of the rear ends of said beams permits the implement to be readily adapted for use as a cultivator, or the like. The improved manner of securing the teeth 11 upon the bars 1 permits them to be readily applied to said bar and enables one or more to be replaced when worn or broken.

Having thus described my invention what I claim and desire to secure by Letters Patent is:—

1. An implement of the character described comprising diverging tooth bars having horizontal apertures at their front ends and vertical apertures at their rear ends, a front cross piece comprising a block having threaded studs projecting therefrom and extending through the apertures in the front ends of said bars, nuts upon said studs on opposite sides of said bars, a rear cross bar having apertures to aline with those in the rear ends of the tooth bars, threaded shanks passed through the alining apertures in said bars and nuts upon said shanks.

2. An implement of the character described comprising diverging tooth bars having horizontal apertures at their front ends and vertical apertures at their rear ends, a front cross piece comprising a block having threaded studs projecting therefrom and extending through the apertures in the front ends of said bars, nuts upon said studs on opposite sides of said bars, a rear cross bar having apertures to aline with those in the rear ends of the tooth bars, threaded shanks passed through the alining apertures in said bars, nuts upon said shanks, upwardly and rearwardly inclined handle bars pivotally connected at their forward ends to said tooth bars, braces for supporting said handle bars and adjustable connections between said braces and the rear cross bar.

In testimony whereof I hereunto affix my signature in presence of two witnesses.

GEORGE H. WELLS.

Witnesses:
J. F. McWILLIAMS,
H. M. HOOPER.